Dec. 24, 1940.   S. WILTSE   2,226,039
FLUID LINE CONNECTION
Original Filed May 31, 1934
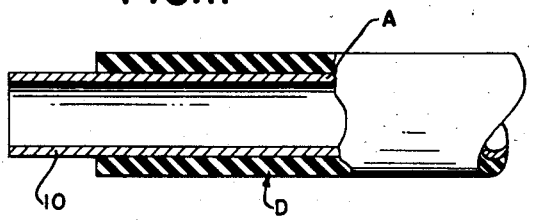
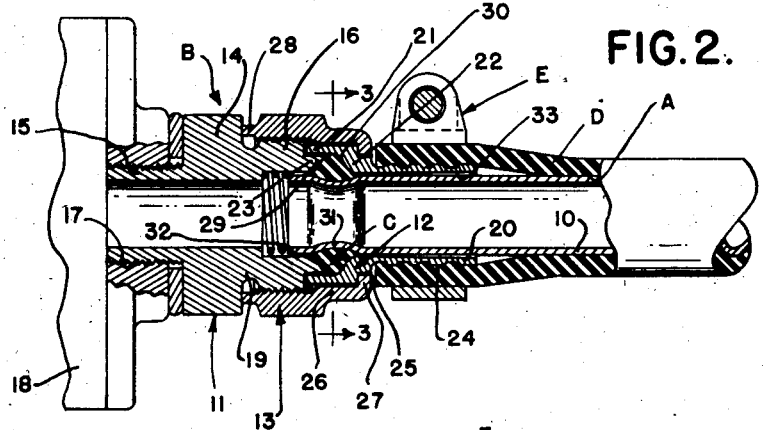
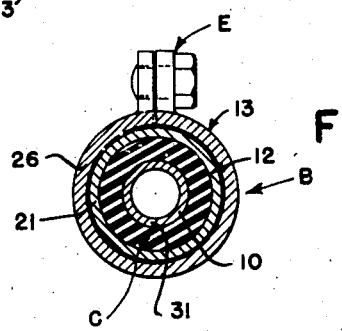
INVENTOR.
SUMNER WILTSE
BY
ATTORNEYS Patented Dec. 24, 1940

2,226,039

UNITED STATES PATENT OFFICE 2,226,039

FLUID LINE CONNECTION

Sumner Wiltse, Detroit, Mich., assignor to Arthur S. Allen, Detroit, Mich.

Continuation of application Serial No. 728,354, May 31, 1934. This application April 22, 1940, Serial No. 331,008

5 Claims. (Cl. 285—90)

This invention relates generally to connections between tubing and fittings therefor, especially to fluid-tight connections between thin walled tubing and sectional fittings, and constitutes a continuation of my application filed May 31, 1934, bearing Serial No. 728,354.

Heretofore connections of various kinds have been made for effecting fluid-tight joints between tubing and fixtures therefor, but in so far as I am aware none has been provided wherein the connection includes a resilient member that not only serves as a seal but as a sound deadener, and is constructed to prevent withdrawal of the tubing endwise from the fitting while allowing universal or angular movement of the tubing relative to the fitting and to prevent fatigue or breakage of the metal of the tube adjacent the fitting.

It is also an object of the present invention to provide a connection that is relatively simple in construction, economical to manufacture, and easy to assemble and install.

Another object is to provide a connection wherein cooperating sections of the fitting have means for definitely and accurately locating the resilient member on the tubing upon initial application of the fitting thereto.

Another object is to provide a connection wherein the clearance between the fitting and tubing is sufficient to permit the universal or angular movement mentioned but is small enough to effectively prevent the resilient member from extruding lengthwise of the fitting when squeezed by the cooperating parts aforesaid of the fitting.

Another object is to provide a connection wherein the resilient member and cooperating parts of the fitting are constructed and arranged in such a way relative to the tubing that the resilient member when squeezed by said cooperating parts will exert sufficient pressure circumferentially of the tubing to form in the latter a transversely curved annular groove or indentation which together with the rounded engaging surface of the distorted resilient member will permit the universal or angular movement of the tubing relative to the fitting according to the amount of clearance aforesaid that is provided.

Another object is to provide a connection wherein the cooperating parts of the fitting have means for definitely limiting the squeezing action thereof against the resilient member so that upon adjustment of one of said cooperating parts a predetermined distance relative to the other, the depth of indentation made in the tubing by the resilient member will correspondingly be predetermined.

Other objects, advantages and novel details of construction of this invention will be made more apparent as this description proceeds, especially when considered in connection with the accompanying drawing, wherein:

Figure 1 is a fragmentary and partly cross sectional view illustrating a fuel or oil line comprising a metal tube having a rubber covering wherein an end sector of the rubber is removed as a preliminary step to employing the connection;

Figure 2 is a cross sectional view illustrating a fluid line connection constructed according to one form of the invention and as applied for connecting the line shown by Figure 1 to apparatus such as a carburetor Figure 3 is a cross sectional view taken substantially along the line 3—3 of Figure 2.

Referring now to the drawing, A is the tubing, B is the fitting and C is the resilient sealing member of a connection embodying my invention.

As shown, the tubing A is formed of relatively soft metal such as aluminum, copper and the like, and has thin walls 10. Such tubing may be any suitable size for conducting fluids such as gasoline, oil, etc., from any suitable device or appliance.

The fitting B is also formed of metal and preferably comprises three sections 11, 12 and 13, respectively. Preferably the section 11 has a polygonal body 14 provided at opposite sides thereof with exteriorly threaded nipple portions 15 and 16, respectively. In the present instance, the nipple portion 15 is smaller in diameter than the nipple portion 16 and engages an interiorly threaded passage 17 in the casing 18 of a carburetor. The nipple portion 16 has a smaller cross section than the polygonal body 14 and is spaced therefrom by a grooved lateral projection 19 of the body. The second section 12 is in the form of a ferrule and has a tubular portion 20, an outwardly offset annular portion 21 and an intermediate connecting shoulder 22. Preferably the tubular portion 20 is sleeved upon the tubing A inside a suitable resilient hose-like covering D for the tubing, while the annular portion 21 encircles in telescoping relation an annular projection 23 of the nipple portion 16 of the section 11. Any suitable means such as the clamp E encircling the resilient covering D may be used to secure the covering to the tubular portion 20 of the second section 12. If desired, the outer surface of the tubular portion 20 may be grooved or roughened as at 24 to insure a non-slip connection between the covering D and tubular part 20 of the second section 12. In this connection it will be noted that the resilient covering D terminates short of the offset annular portion 21 of the second section 12 so as to provide an annular space 25 therebetween. The third section 13 is in the form of a polygonal nut and is interiorly threaded for engagement with the exteriorly threaded nipple portion 16 of the first section 11. Projecting laterally from one side of the third section 13 is an annular portion 26 encircling and substantially concentric with the annular portion 21 of the second section 12 and provided at its free end in the annular space 25 with an inturned annular flange 27 that overhangs and is in pressure engagement with the outer end of the annular portion 21 of the second section 12. At the other side of the third section 13 is an annular lateral projection 28 that is engageable with the polygonal body 14 of the first section 11 to limit movement of the third section 13 toward said first section.

In the present instance, when the parts are in the position illustrated in Figure 2, the end 29 of the projection 28 of the first section 11 and the shoulder 22 of the second section 12 are spaced apart and cooperate with the annular portion 21 to form an annular channel or groove 30 having diverging walls.

The resilient sealing member C is in the form of an annulus and is preferably made of synthetic rubber impervious to gasoline and oil and having advantageous characteristics for the purposes for which it is used. As shown, this annular sealing member C engages an annular indentation 31 in the tubing A and the diverging walls of the groove 30 in the fitting. In practice, such sealing member C is squeezed by the diverging walls of groove 30 into fluid-tight engagement with the annular indentation 31 in the tubing. Actually the inside diameter of the sealing member C before it is applied to the tubing is slightly less than the outside diameter thereof so that such sealing member has to be stretched somewhat when it is initially slipped over the free end of the tubing. Moreover, such tubing is initially of uniform diameter without any indentation such as 31. However, due to the construction and arrangement of the sections 11, 12 and 13 of the fitting, the nature and formation of the sealing member C and the thin walls 10 of the tubing, the annular indentation 31 in the tubing will be formed by the resilient sealing member C when the latter is squeezed sufficiently by the diverging walls of the groove 30. As shown, this indentation 31 is curved transversely and the engaging surface of the sealing member C is correspondingly rounded. Moreover, there is sufficient clearance between the tubing A and inside walls 32 of the nipple portion 16 and between the tubing and inside walls 33 of the tubular part 20 of the second section 12 of the fitting to permit angular or universal movement of the tubing about the center of the annular sealing member C. In this connection it should be appreciated that the surfaces of the sealing member C adhere or remain in fixed relation to the surfaces of the groove 30 and indentation 31, and that the angular or universal movement of the tubing will be permitted by movement of the yieldable or flexible material within the resilient body of the sealing member C. Thus, there is no relative movement between the sealing member and the fitting or the tubing that would cause wear and ultimate leakage, as would be the case if a metal or other non-yielding or non-flexible sealing material were employed. However, the seal effected by the member C remains intact during such angular or universal movement.

Preferably the synthetic rubber used in the sealing member C has all the advantages of natural rubber in so far as deformation, flexibility, tensile strength, etc., are concerned, and in addition to being impervious to gasolines and oils it will stand heat up to approximately 350° F.

Although the clearance provided between the tubing A and sections 11 and 12 of the fitting is sufficient to permit a limited angular or universal movement, it is insufficient to permit extrusion of the particular sealing member C endwise of the tubing outwardly through the fitting. Thus, the pressure exerted by the sealing ring is transverse only of the tubing. Preferably the clearance is approximately .004 inch which is satisfactory for both purposes.

It should also be noted that the cooperating sections 11 and 12 of the fitting are formed so that they will locate or position the sealing ring C at the proper point on the tubing after its initial application thereto. For example, if the ring C is not slipped far enough on the tubing, then the end 29 of the projection 28 of the first section 11 will push the ring forward to the proper place. If the ring C is slipped too far on the tubing, then the shoulder 22 of the second section 12 will push the ring back to the proper place. Thus, when the sections 11 and 12 are initially drawn together by the third section 13, the ring C will be at the proper point of the tubing relative to the free end thereof, and when the sections 11 and 12 are adjusted further so that sufficient pressure is exerted thereby against the ring C to cause it to form the annular indentation 31 in the tubing, the indentation so formed will be in proper spaced relation to the free end of the tubing to provide an efficient construction. Engagement of the annular projection 28 of the third section 13 with the polygonal body 14 of the first section 11 will limit the squeezing pressure on the sealing ring C so that the depth of the indentation 31 formed by the squeezing action will be predetermined and controlled. This limiting feature is important because it insures a definite constriction upon the tube.

Thus, from the foregoing it will be apparent that the connection has a fluid-tight seal and that the parts accomplishing this are constructed and arranged so that there is no relative movement between the ring C and tubing A or the ring and fitting B which would cause wear and result in leakage. The connection also prevents the tubing A from being accidentally withdrawn or pressure blown axially of the fitting B, but permits at the same time angular or universal movement of the tubing A relative to the fitting B. Hence, the tubing is relieved of binding strains and stresses, especially in the event of misalignment. Such construction also relieves the tubing of fatigue and possible breakage adjacent the fitting. The use of the resilient ring C also reduces noise transmission as it cushions and dampens vibration.

What I claim as my invention is:

1. A fluid line connection comprising a rubber covered, seamless metal tube wherein the seamless metal tube projects beyond the end of the rubber, a ferrule extending between the rubber and metal tube, means clamping the rubber covering around the ferrule, a member on the metal tube beyond the end of the ferrule, said member and ferrule having a space between their ends defined by tapered surfaces diverging towards the metal tube, a substantially incompressible and resilient rubber sealing ring substantially insoluble in hydrocarbons disposed in said space, and a coupling member for drawing the ends of the ferrule and member toward each other so as to apply compressing forces to the ring and force it into engagement with the metal tube, said metal tube being of smaller outside diameter than the internal diameter of the ferrule and first mentioned member so that the metal tube may have a universal movement relative to the connection, and said rubber ring permitting this universal movement by reason of its resiliency without disturbing the surface engagements of the ring.

2. In a connection of the class described, a tube, a fitting encircling the tube with clearance therebetween to permit tilting of the tube relative to the fitting or vice versa, a fluid-tight seal between the tube and fitting including a ring of resilient material sleeved on the tube within the fitting, the tube and fitting having opposed annular grooves receiving and cooperating with the ring to prevent endwise movement of the tube relative to the fitting while permitting the tilting movement aforesaid, the ring filling completely and bearing firmly against the walls of the opposed annular grooves in the tube and fitting so that the tilting action aforesaid is taken up within the resilient body of the ring, opposite walls of the groove in the fitting being relatively movable and coacting to maintain the firm engagement aforesaid of the ring with the walls of the grooves, the clearance between the tube and fitting adjacent opposite walls of the grooves therein being insufficient to permit extrusion of the ring from the fitting endwise of the tube.

3. In a connection of the class described, a tube, a fitting encircling the tube with clearance therebetween to permit tilting of the tube relative to the fitting or vice versa, said fitting including a pair of members movable relatively along the tube and a nut threadedly engaging one of said members and having means for moving the other of said members toward the first mentioned member, said relatively movable members having adjacent wall surfaces defining an annular groove, the tube having an annular groove opposite the groove just mentioned, and a fluid-tight seal between the fitting and tube cooperating therewith to prevent endwise movement of the tube while permitting the tilting movement aforesaid and including a ring of resilient material filling completely and bearing firmly against the walls of the grooves, the clearance between the tube and fitting adjacent the walls of the grooves being insufficient to permit extrusion of the ring from the fitting endwise of the tube.

4. In a connection of the class described, a tube, a fitting encircling the tube with clearance therebetween to permit tilting of the tube relative to the fitting or vice versa, said fitting including a pair of members movable relatively along the tube and a nut threadedly engaging one of said members and having means for moving the other of said members toward the first mentioned member, said relatively movable members having adjacent wall surfaces defining an annular groove, the tube having an annular groove opposite the groove just mentioned, and a fluid-tight seal between the fitting and tube cooperating therewith to prevent endwise movement of the tube while permitting the tilting movement aforesaid and including a ring of resilient material filling completely the grooves and squeezed radially against the tube by the pair of members aforesaid, the nut and one of the members aforesaid having portions so dimensioned and coacting to limit to a predetermined degree the adjustment of the nut and the amount to which the ring is squeezed by said pair of members against the tube.

5. In a connection of the class described, a tube, a fitting encircling the tube with clearance therebetween to permit tilting of the tube relative to the fitting or vice versa, a fluid-tight seal between the tube and fitting including a ring of resilient material sleeved on the tube within the fitting, the tube and fitting having opposed annular grooves receiving and cooperating with the ring to prevent endwise movement of the tube relative to the fitting while permitting the tilting movement aforesaid, opposite walls of the groove in the fitting being relatively movable and coacting to deform or cause to flow the resilient sealing ring firmly against the walls of the grooves aforesaid so that the ring is held against movement relative to the walls of said grooves during the tilting movement aforesaid, the fitting having means for limiting relative movement between the opposite walls of the groove therein.

SUMNER WILTSE.